United States Patent
Jauh et al.

(10) Patent No.: US 11,570,661 B2
(45) Date of Patent: Jan. 31, 2023

(54) SIGNALING TRANSMISSION METHOD AND DEVICE, SIGNALING RECEPTION METHOD AND DEVICE, STORAGE MEDIUM AND TERMINAL

(71) Applicant: SPREADTRUM COMMUNICATIONS (SHANGHAI) CO., LTD., Shanghai (CN)

(72) Inventors: Yuhren Jauh, Shanghai (CN); Yanchao Xu, Shanghai (CN); Chinghwa Yu, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 25 days.

(21) Appl. No.: 16/959,776

(22) PCT Filed: Apr. 26, 2020

(86) PCT No.: PCT/CN2020/086938
§ 371 (c)(1),
(2) Date: Jul. 2, 2020

(87) PCT Pub. No.: WO2020/233349
PCT Pub. Date: Nov. 26, 2020

(65) Prior Publication Data
US 2021/0410004 A1    Dec. 30, 2021

(30) Foreign Application Priority Data
May 23, 2019    (CN) .......................... 201910435235.6

(51) Int. Cl.
*H04W 28/06* (2009.01)
*H04L 1/00* (2006.01)
(Continued)

(52) U.S. Cl.
CPC .......... *H04W 28/06* (2013.01); *H04L 1/0018* (2013.01); *H04L 47/801* (2013.01); *H04W 28/12* (2013.01);
(Continued)

(58) Field of Classification Search
None
See application file for complete search history.

(56) References Cited

U.S. PATENT DOCUMENTS

| 2006/0057968 | A1* | 3/2006 | Ohtani | ............... H04L 12/403 455/445 |
| 2008/0130687 | A1* | 6/2008 | Ha | .................. H04L 12/2818 370/498 |

(Continued)

FOREIGN PATENT DOCUMENTS

| CN | 1947369 A | 4/2007 |
| CN | 101056258 A | 10/2007 |

(Continued)

OTHER PUBLICATIONS

International Search Report for International Application No. for PCT/CN2020/086938; dated Jul. 24, 2020.

(Continued)

*Primary Examiner* — Alpus Hsu
*Assistant Examiner* — Camquyen Thai
(74) *Attorney, Agent, or Firm* — Cantor Colburn LLP

(57) ABSTRACT

A signaling transmission method and device, a signaling reception method and device, a storage medium and a terminal are provided. The signaling transmission method includes: if an advanced setting for transmitting Real Time Application (RTA) packets is supported, configuring an indication signaling, wherein the indication signaling is used to instruct a Wireless Local Area Network (WLAN) station to transmit a packet based on packet duration limitation (Continued)

and/or transmission opportunity duration limitation; and transmitting the indication signaling. Embodiments of the present disclosure may shorten latency to meet communication requirements of RTA.

17 Claims, 3 Drawing Sheets

(51) Int. Cl.
 *H04L 47/80* (2022.01)
 *H04W 28/12* (2009.01)
 *H04W 48/10* (2009.01)
 *H04W 48/12* (2009.01)
 *H04W 84/12* (2009.01)

(52) U.S. Cl.
 CPC .......... *H04W 48/10* (2013.01); *H04W 48/12* (2013.01); *H04W 84/12* (2013.01)

(56) References Cited

U.S. PATENT DOCUMENTS

| | | | |
|---|---|---|---|
| 2008/0165742 A1* | 7/2008 | Marinier | H04W 72/14 370/332 |
| 2008/0250299 A1 | 10/2008 | Maillet et al. | |
| 2011/0170525 A1* | 7/2011 | Lee | H04W 74/04 370/338 |
| 2011/0268054 A1* | 11/2011 | Abraham | H04W 74/06 370/329 |
| 2012/0063301 A1 | 3/2012 | Schel | |
| 2015/0146654 A1* | 5/2015 | Chu | H04L 1/1887 370/329 |
| 2016/0037553 A1* | 2/2016 | Attar | H04W 74/04 370/338 |
| 2017/0055287 A1 | 2/2017 | Yang et al. | |
| 2018/0213566 A1* | 7/2018 | Baron | H04W 72/1242 |

FOREIGN PATENT DOCUMENTS

| | | | |
|---|---|---|---|
| CN | 101442778 A | 5/2009 | |
| CN | 104202822 A | 12/2014 | |
| EP | 2896262 B1 * | 10/2018 | ........ H04W 52/0235 |
| WO | 2018073171 A1 | 4/2018 | |

OTHER PUBLICATIONS

Kim et al., "ATXOP: An Adaptive TXOP based on the Data Rate to Guarantee fairness for IEEE 802.11 e wireless LANs", Department of Computer Science and Engineering Pohang University of Science and Technology, vol. 4, Dated Oct. 2004; pp. 2678-2682.

Huang, "Adaptive scheduling scheme to support real-time traffic in wireless local area networks", Journal of Computer Applications, vol. 28, No. 11; Nov. 2008; pp. 2759-2762. With English abstract.

CNIPA 1st Office Action for corresponding CN Application No. 201910435235.6; dated Mar. 1, 2022.

IEEE, "802 submission to 3GPP LAA Workshop", doc.: IEEE 802.19-15/0069r7; Aug. 17, 2015; 53 pages.

* cited by examiner

SIGNALING TRANSMISSION METHOD AND DEVICE, SIGNALING RECEPTION METHOD AND DEVICE, STORAGE MEDIUM AND TERMINAL

CROSS-REFERENCE TO RELATED APPLICATIONS

This is the U.S. national stage application No. PCT/CN2020/086938, filed on Apr. 26, 2020 Priority under 35 U.S.C. 0119(a) and 35 U.S.C. 0365(b) is claimed from Chinese Patent Application No 201910435235 6, filed May 23, 2019, the disclosure of which is also incorporated herein by reference.

TECHNICAL FIELD

The present disclosure generally relates to communication technology field, and more particularly, to a signaling transmission method and device, a signaling reception method and device, a storage medium and a terminal.

BACKGROUND

Real time application (RTA) in WiFi devices is getting popular. Latency is one of key factors for RTA.

The current Institute of Electrical and Electronics Engineers 802.11 (IEEE 802.11) standard (for example, the Wireless Local Area Network (WLAN) standard) cannot guarantee latency at the worst case.

SUMMARY

Embodiments of the present disclosure may shorten latency to meet communication requirements of RTA in a WLAN system.

In an embodiment of the present disclosure, a signaling transmission method is provided, including: if an advanced setting for transmitting RTA packets is supported, configuring an indication signaling, wherein the indication signaling is used to instruct a WLAN Station (STA) to transmit a packet based on packet duration limitation and/or transmission opportunity duration limitation; and transmitting the indication signaling.

Optionally, transmitting the indication signaling includes: transmitting the indication signaling via a beacon frame.

Optionally, transmitting the indication signaling includes: transmitting the indication signaling via a broadcast packet.

Optionally, transmitting the indication signaling includes: transmitting the indication signaling via a unicast packet in a handshake interaction process.

Optionally, when the indication signaling includes the packet duration limitation, the indication signaling further includes a longest duration of the packet.

Optionally, the method further includes: following transmitting the indication signaling including the transmission opportunity duration limitation, transmitting a transmission opportunity duration extension signaling.

In an embodiment of the present disclosure, a signaling reception method is provided, including: receiving an indication signaling, wherein the indication signaling is used to instruct a WLAN STA to transmit a packet based on packet duration limitation and/or transmission opportunity duration limitation, and is configured by a WLAN Access Point (AP) which supports an advanced setting for transmitting RTA packets; and setting a duration of the packet based on the indication signaling to meet the packet duration limitation and/or transmission opportunity duration limitation.

Optionally, receiving the indication signaling includes: receiving the indication signaling via a beacon frame.

Optionally, receiving the indication signaling includes: receiving the indication signaling via a broadcast packet.

Optionally, receiving the indication signaling includes: receiving the indication signaling via a unicast packet in a handshake interaction process.

Optionally, when the indication signaling includes the packet duration limitation, the indication signaling further includes a longest duration of the packet.

Optionally, the method further includes: following receiving the indication signaling including the transmission opportunity duration limitation, receiving a transmission opportunity duration extension signaling.

In an embodiment of the present disclosure, a signaling transmission device is provided, including: a configuring circuitry configured to: if an advanced setting for transmitting RTA packets is supported, configure an indication signaling, wherein the indication signaling is used to instruct a WLAN STA to transmit a packet based on packet duration limitation and/or transmission opportunity duration limitation; and a transmitting circuitry configured to transmit the indication signaling.

In an embodiment of the present disclosure, a signaling reception device is provided, including: a receiving circuitry configured to receive an indication signaling, wherein the indication signaling is used to instruct a WLAN STA to transmit a packet based on packet duration limitation and/or transmission opportunity duration limitation, and is configured by a WLAN AP which supports an advanced setting for transmitting RTA packets; and a setting circuitry configured to set a duration of the packet based on the indication signaling to meet the packet duration limitation and/or transmission opportunity duration limitation.

In an embodiment of the present disclosure, a storage medium having computer instructions stored therein is provided, wherein when the computer instructions are executed, the above method is performed.

In an embodiment of the present disclosure, a terminal including a memory and a processor is provided, wherein the memory has computer instructions stored therein, and when the processor executes the computer instructions, the above method is performed.

Embodiments of the present disclosure may provide following advantages.

Embodiments of the present disclosure provide a signaling transmission method, including: if an advanced setting for transmitting RTA packets is supported, configuring an indication signaling, wherein the indication signaling is used to instruct a WLAN STA to transmit a packet based on packet duration limitation and/or transmission opportunity duration limitation; and transmitting the indication signaling. In the embodiments, based on the set packet duration limitation and/or transmission opportunity duration limitation, devices may transmit packets meeting the packet duration limitation or packets meeting the transmission opportunity duration limitation, so that a packet does not occupy a too long time of air interface. In this way, latency may be shortened, and thus requirements of RTA packet transmission may be met.

Further, the signaling transmission method further includes: following transmitting the indication signaling including the transmission opportunity duration limitation, transmitting a transmission opportunity duration extension signaling. In the embodiments, with the transmission opportunity duration extension signaling, the WLAN STA supporting the packet duration limitation is not limited by a shortened transmission opportunity duration, and can employ a transmission opportunity duration used in conventional WLAN communication, which may increase a data transmission rate.

DETAILED DESCRIPTION

As described in the background, existing Wi-Fi transmission solutions cannot guarantee latency at the worst case to well support RTA.

Inventors found based on research that, there are many factors that contribute to long latency of Wi-Fi transmission, and one of these factors is a too long time of air interface occupied by a packet. To transmit an RTA packet in time to further realize RTA communication, the packet duration cannot be too long.

Embodiments of the present disclosure provide a signaling transmission method, including: if an advanced setting for transmitting RTA packets is supported, configuring an indication signaling, wherein the indication signaling is used to instruct a WLAN STA to transmit a packet based on packet duration limitation and/or transmission opportunity duration limitation; and transmitting the indication signaling. In the embodiments, based on the set packet duration limitation and/or transmission opportunity duration limitation, devices may transmit packets meeting the packet duration limitation or packets meeting the transmission opportunity duration limitation, so that a packet does not occupy a too long time of air interface. In this way, latency may be shortened, and thus requirements of RTA packet transmission may be met.

In order to clarify the objects, characteristics and advantages of the disclosure, embodiments of present disclosure will be described in detail in conjunction with accompanying drawings.

Figure 1:
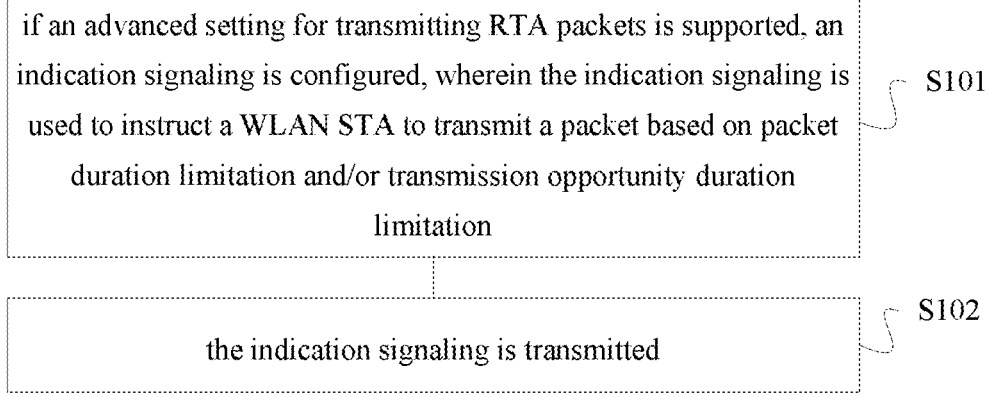
FIG. 1 is a flow chart of a signaling transmission method according to an embodiment.

FIG. 1 is a flow chart of a signaling transmission method according to an embodiment. The method may be performed by a WLAN AP. In some embodiments, the method may include S101 and S102.

In S101, if an advanced setting for transmitting RTA packets is supported, an indication signaling is configured, wherein the indication signaling is used to instruct a WLAN STA to transmit a packet based on packet duration limitation and/or transmission opportunity duration limitation.

In S102, the indication signaling is transmitted.

In some embodiments, the AP and the STA may use a same identification number to form a Basic Service Set (BSS). Terminals within the BSS can communicate with each another based on a same Service Set Identifier (SSID).

In S101, if the AP supports an advanced setting for transmitting RTA packets within the BSS, packet duration limitation and/or transmission opportunity (TXOP) duration limitation may be set, thereby shortening a packet to be transmitted and limiting a longest transmission duration occupied by an air interface of the packet. It should be noted that, a longest transmission duration of a packet that meets the packet duration limitation is shorter than a longest allowable transmission duration of a packet generated by a conventional WLAN STA, and a longest transmission duration of a packet that meets the TXOP duration limitation is shorter than the longest allowable transmission duration of the packet generated by the conventional WLAN STA.

Afterward, the AP may configure indication signaling which includes information about the packet duration limitation and/or TXOP duration limitation and is used to instruct the WLAN STA to transmit a packet based on the packet duration limitation or the TXOP duration limitation. The packet may be a packet which is generated by the WLAN STA after receiving the indication signaling and meets the packet duration limitation or the TXOP duration limitation.

In S102, the AP may transmit the indication signaling.

In some embodiments, the AP may dispose the indication signaling in a beacon frame and transmits the beacon frame periodically. If the indication signaling includes the packet duration limitation, the indication signaling may further indicate a transmission duration of the packet.

In some embodiments, the AP may transmit the indication signaling via a broadcast packet. If the indication signaling includes the packet duration limitation, the indication signaling may further indicate a transmission duration of the packet.

In some embodiments, the AP may transmit the indication signaling via a unicast packet in a handshake interaction process. If the indication signaling includes the packet duration limitation, the indication signaling may further indicate a transmission duration of the packet.

In some embodiments, a longest duration of the packet may be predefined by a standard. In this case, the indication signaling may not indicate the longest duration of the packet.

In some embodiments, if merely a conventional WLAN STA is included in the BSS, the indication signaling configured by the AP may merely be used to instruct the WLAN STA to transmit the packet based on the TXOP duration limitation.

In some embodiments, if terminals (for example, STA and AP) within the BSS all support the packet duration limitation, the indication signaling may merely be used to instruct a receiving terminal to transmit the packet based on the packet duration limitation.

In some embodiments, if there are both a terminal that does not support the packet duration limitation and a terminal that supports the packet duration limitation, the AP that supports a demander of RTA packet transmission may use the indication signaling to instruct the STA that supports the packet duration limitation to transmit the packet based on the packet duration limitation, and to instruct the terminal that does not support the packet duration limitation to transmit the packet based on the TXOP duration limitation.

In some embodiments, the terminal that supports the packet duration limitation can decode to acquire the packet duration limitation, but the terminal that does not support the packet duration limitation cannot decode to acquire the packet duration limitation. Therefore, the AP that supports the demander of RTA packet transmission may transmit the indication signaling including the packet duration limitation, so that the terminal that receives the packet duration limitation can transmit the packet based on the packet duration limitation. Compared with a conventional packet, in the embodiments, a longest allowable duration of an air interface of the packet is shorter.

Further, as both the terminal that supports the packet duration limitation and the terminal that does not support the packet duration limitation can decode to acquire the indication signaling including the TXOP duration limitation, the terminal receiving the indication signaling including the TXOP duration limitation may use the TXOP duration limitation to transmit the packet whose longest allowable duration of an air interface is shorter than a longest allowable duration of an air interface of a conventional packet.

However, the terminal that performs data transmission based on the packet duration limitation and supports the packet duration limitation can also decode to acquire a relatively short TXOP duration limitation, and thus may be limited by the relatively short TXOP duration limitation, which may reduce data transmission efficiency of the terminal supporting the packet duration limitation. Therefore, the AP may transmit a TXOP duration extension signaling after transmitting the indication signaling including the TXOP duration limitation, so that the terminal supporting the packet duration limitation is no longer limited by the relatively short TXOP duration limitation, which facilitates improving system performance of the terminal supporting the packet duration limitation. The TXOP duration extension signaling may be a group of long indication signaling regarding TXOP duration limitation, and transmitted in a way that can be recognized by the terminal that merely supports the packet duration limitation.

Figure 2:
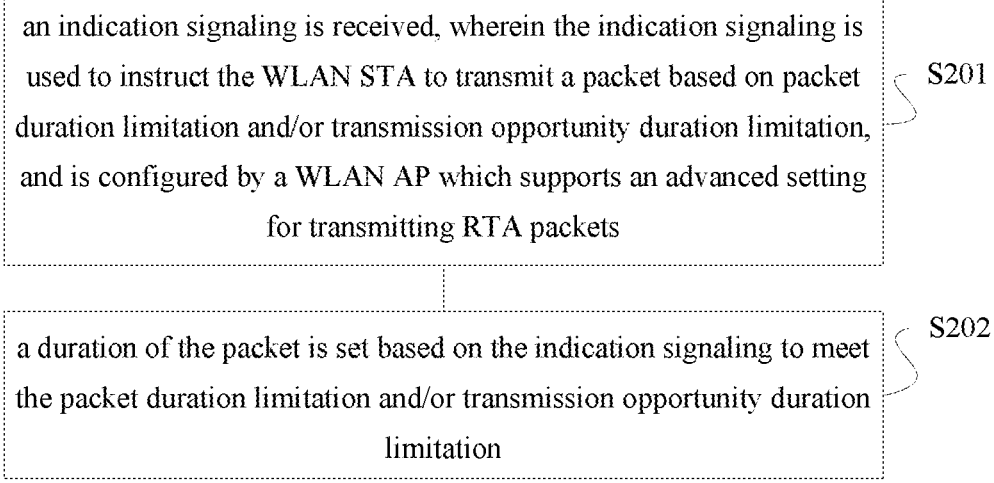
FIG. 2 is a flow chart of a signaling reception method according to an embodiment.

FIG. 2 is a flow chart of a signaling reception method according to an embodiment. The method may be performed by a WLAN STA.

In some embodiments, the method may include S201 and S202.

In S201, an indication signaling is received, wherein the indication signaling is used to instruct the WLAN STA to transmit a packet based on packet duration limitation and/or transmission opportunity duration limitation, and is configured by a WLAN AP which supports an advanced setting for transmitting RTA packets.

In S202, a duration of the packet is set based on the indication signaling to meet the packet duration limitation and/or transmission opportunity duration limitation.

In some embodiments, in S201, the WLAN STA may receive indication signaling which is transmitted from the AP and used to instruct the WLAN STA to transmit a packet based on the packet duration limitation and/or the transmission opportunity duration limitation. The indication signaling may be configured when the AP supports an advanced setting for transmitting RTA packets.

In some embodiments, the AP may transmit the indication signaling via a beacon frame. Accordingly, the WLAN STA may receive the indication signaling via the beacon frame.

In some embodiments, the AP may transmit the indication signaling via a broadcast packet. Accordingly, the WLAN STA may receive the indication signaling via the broadcast packet.

In some embodiments, the AP may transmit the indication signaling via a unicast packet in a handshake interaction process. Accordingly, the WLAN STA may receive the indication signaling via the unicast packet.

In some embodiments, if the indication signaling includes the packet duration limitation, the indication signaling may further include a longest duration of the packet. In some embodiments, the longest duration of the packet may be predefined by a standard and does not need to be indicated in the indication signaling.

Those skilled in the art could understand that, in a BSS that includes a terminal that does not support the packet duration limitation and a terminal that supports the packet duration limitation, to effectively avoid reducing data transmission efficiency of the terminal that supports the packet duration limitation, an AP supporting a demander of RTA packet transmission may transmit the TXOP duration extension signaling after transmitting the indication signaling including the TXOP duration limitation. Accordingly, after receiving the indication signaling including the TXOP duration limitation, the WLAN STA supporting the packet duration limitation may receive and decode the TXOP duration extension signaling, so as to use a longer TXOP for data transmission.

It should be noted that although the WLAN STA that does not support the packet duration limitation can receive the TXOP duration extension signaling, the WLAN STA may drop the TXOP duration extension signaling if it cannot decode the TXOP duration extension signaling. The TXOP duration extension signaling may be a group of long indication signaling regarding TXOP duration limitation, and transmitted in a way that can be recognized by the terminal that merely supports the packet duration limitation. In the following, specific embodiments are described.

In one embodiment, the packet duration limitation may be limited by a beacon frame, by a broadcast packet, or in a predefined manner. A standard supporting the packet duration limitation and a terminal manufactured in accordance with the standard may comply with the packet duration limitation.

In one embodiment, for WLAN STAs that do not support the packet duration limitation, the TXOP duration limitation may be used to limit a packet duration. For example, a short TXOP duration limitation shorter than a current TXOP duration is used to limit a longest duration of an air interface of a packet to be transmitted.

It should be noted that the short TXOP duration limitation may affect network performance. For a WLAN STA that supports the packet duration limitation, there is no need to limit the duration of the air interface of the transmitted packet based on the short TXOP duration limitation. However, as the WLAN STA that supports the packet duration limitation has the ability to decode to acquire information about the short TXOP duration limitation, a long TXOP duration limitation may be set for the WLAN STA that supports the packet duration limitation, and be carried by the TXOP duration extension signaling, to notify the WLAN STA that supports the packet duration limitation to adopt the long TXOP duration limitation to extend a duration of a transmission opportunity. The TXOP duration extension signaling may be a group of long indication signaling regarding TXOP duration limitation, and transmitted in a way that can be recognized by the terminal that merely supports the packet duration limitation.

Figure 3:
FIG. 3 is a diagram of indication signaling in the signaling transmission method as shown in FIG. 1.

FIG. 3 is a diagram of indication signaling in the signaling transmission method as shown in FIG. 1. Referring to FIG. 3, in some embodiments, the AP may use a conventional signaling format to transmit the indication signaling including the short TXOP duration limitation for use by a conventional WLAN STA.

Afterward, the AP may use a new signaling format to transmit the indication signaling including the long TXOP duration limitation to enable a WLAN STA that supports the packet duration limitation to set a TXOP duration based on the long TXOP duration limitation. The conventional WLAN STA cannot decode the new signaling format. Therefore, even if the conventional WLAN STA receives the indication signaling of the new signaling format, the conventional WLAN STA may still use the short TXOP duration limitation to perform data transmission and reception.

In some embodiments, the indication signaling including the TXOP duration limitation may be disposed in a control frame, and be indicated by an additional TXOP limitation information field. The WLAN STA supporting the packet duration limitation can decode to acquire the TXOP duration limitation in the additional TXOP limitation information field.

Those skilled in the art could understand that S201 and S202 can be regarded to be corresponding to S101 and S102 described in the embodiment as shown in FIG. 1. They are complementary in detailed implementation principles and logic. Therefore, the signaling reception method and terminology of the WLAN STA may be referred to the above descriptions of the embodiment as shown in FIG. 1, which are not described in detail here.

From above, in the embodiments of the present disclosure, based on the packet duration limitation and/or transmission opportunity duration limitation, a packet may not occupy a too long time of air interface. In this way, latency may be shortened, and thus requirements of RTA packet transmission may be met.

Figure 4:
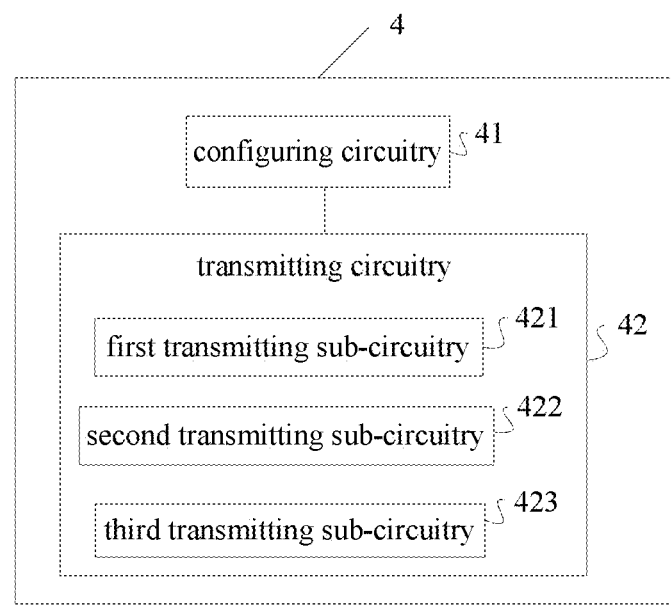
FIG. 4 is a structural diagram of a signaling transmission device according to an embodiment.

FIG. 4 is a structural diagram of a signaling transmission device according to an embodiment. The signaling transmission device 4 may be applied in a WLAN AP to perform the method as shown in FIG. 1 and FIG. 3.

The signaling transmission device 4 includes: a configuring circuitry 41 configured to: if an advanced setting for transmitting RTA packets is supported, configure an indication signaling, wherein the indication signaling is used to instruct a WLAN STA to transmit a packet based on packet duration limitation and/or transmission opportunity duration limitation; and a transmitting circuitry 42 configured to transmit the indication signaling.

In some embodiments, the transmitting circuitry 42 includes a first transmitting sub-circuitry 421 configured to transmit the indication signaling via a beacon frame.

In some embodiments, the transmitting circuitry 42 includes a second transmitting sub-circuitry 422 configured to transmit the indication signaling via a broadcast packet.

In some embodiments, when the indication signaling includes the packet duration limitation, the indication signaling further includes a longest duration of the packet.

In some embodiments, the transmitting circuitry 42 includes a third transmitting sub-circuitry 423 configured to transmit the indication signaling via a unicast packet in a handshake interaction process.

More details of working principles and working modes of the device 4 can be found in the above descriptions of FIG. 1 and FIG. 3, and are not described here.

Figure 5:
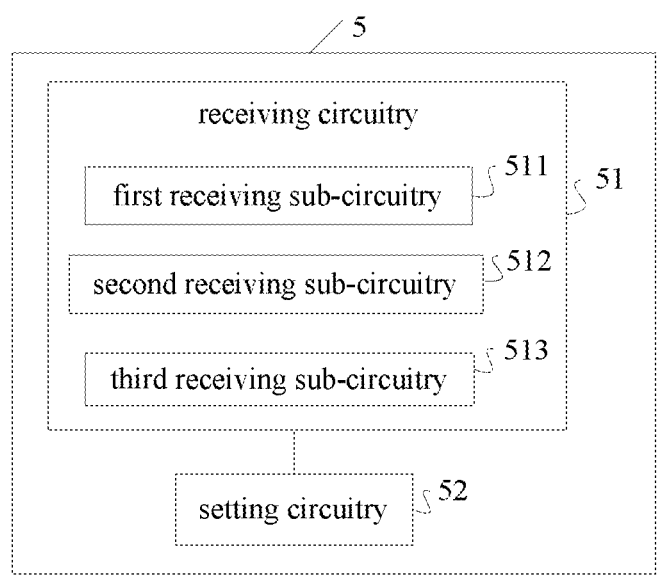
FIG. 5 is a structural diagram of a signaling reception device according to an embodiment.

FIG. 5 is a structural diagram of a signaling reception device according to an embodiment. The signaling reception device 5 can perform the method as shown in FIG. 2, and may be applied in a WLAN STA.

In some embodiments, the signaling reception device 5 includes: a receiving circuitry 51 configured to receive an indication signaling, wherein the indication signaling is used to instruct a WLAN STA to transmit a packet based on packet duration limitation and/or transmission opportunity duration limitation, and is configured by a WLAN AP which supports an advanced setting for transmitting RTA packets; and a setting circuitry 52 configured to set a duration of the packet based on the indication signaling to meet the packet duration limitation and/or transmission opportunity duration limitation.

In some embodiments, the receiving circuitry 51 includes a first receiving sub-circuitry 511 configured to receive the indication signaling via a beacon frame.

In some embodiments, the receiving circuitry 51 includes a second receiving sub-circuitry 512 configured to receive the indication signaling via a broadcast packet.

In some embodiments, when the indication signaling includes the packet duration limitation, the indication signaling further includes a longest duration of the packet.

In some embodiments, the receiving circuitry 51 includes a third receiving sub-circuitry 513 configured to receive the indication signaling via a unicast packet in a handshake interaction process.

More details of working principles and working modes of the device 5 can be found in the above descriptions of FIG. 2, and are not described here.

In an embodiment of the present disclosure, a storage medium having computer instructions stored therein is provided, wherein when the computer instructions are executed, the above methods as shown in FIG. 1 to FIG. 3 are performed. The storage medium may include a non-volatile or non-transitory memory. The storage medium may include a Read Only Memory (ROM), a Random Access Memory (RAM), a magnetic disk or an optical disk.

In an embodiment of the present disclosure, a terminal including a memory and a processor is provided, wherein the memory has computer instructions stored therein, and when the processor executes the computer instructions, the above methods as shown in FIG. 1 to FIG. 3 are performed. In some embodiments, the terminal may be a WLAN AP or a WLAN STA.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A signaling transmission method, comprising:
if an advanced setting for transmitting Real Time Application (RTA) packets is supported, configuring an indication signaling, wherein the indication signaling is used to instruct a Wireless Local Area Network (WLAN) station to transmit a packet based on packet duration limitation, transmission opportunity duration limitation, or packet duration limitation and transmission opportunity duration limitation, wherein a longest transmission duration of a packet that meets the packet duration limitation is shorter than a longest allowable transmission duration of a packet generated by a WLAN Station (STA), and a longest transmission duration of a packet that meets the transmission opportunity duration limitation is shorter than the longest allowable transmission duration of the packet generated by the WLAN STA; and
transmitting the indication signaling.

2. The method according to claim 1, wherein transmitting the indication signaling comprises:
transmitting the indication signaling via a beacon frame.

3. The method according to claim 1, wherein transmitting the indication signaling comprises:
transmitting the indication signaling via a broadcast packet.

4. The method according to claim 1, wherein transmitting the indication signaling comprises:
   transmitting the indication signaling via a unicast packet in a handshake interaction process.

5. The method according to claim 1, wherein when the indication signaling comprises the packet duration limitation, the indication signaling further comprises a longest duration of the packet.

6. The method according to claim 1, further comprising:
   following transmitting the indication signaling comprising the transmission opportunity duration limitation, transmitting a transmission opportunity duration extension signaling.

7. A non-transitory storage medium having computer instructions stored therein, wherein when the computer instructions are executed, the method according to claim 1 is performed.

8. A terminal comprising a memory and a processor, wherein the memory has computer instructions stored therein, and when the processor executes the computer instructions, the method according to claim 1 is performed.

9. A signaling reception method, comprising:
   receiving an indication signaling, wherein the indication signaling is used to instruct a Wireless Local Area Network (WLAN) station to transmit a packet based on packet duration limitation, transmission opportunity duration limitation, or packet duration limitation and transmission opportunity duration limitation, and is configured by a WLAN access point which supports an advanced setting for transmitting Real Time Application (RTA) packets; and
   setting a duration of the packet based on the indication signaling to meet the packet duration limitation, the transmission opportunity duration limitation, or the packet duration limitation and the transmission opportunity duration limitation,
   wherein a longest transmission duration of a packet that meets the packet duration limitation is shorter than a longest allowable transmission duration of a packet generated by a WLAN Station (STA), and a longest transmission duration of a packet that meets the transmission opportunity duration limitation is shorter than the longest allowable transmission duration of the packet generated by the WLAN STA.

10. The method according to claim 9, wherein receiving the indication signaling comprises:
    receiving the indication signaling via a beacon frame.

11. The method according to claim 9, wherein receiving the indication signaling comprises:
    receiving the indication signaling via a broadcast packet.

12. The method according to claim 9, wherein receiving the indication signaling comprises:
    receiving the indication signaling via a unicast packet in a handshake interaction process.

13. The method according to claim 9, wherein when the indication signaling comprises the packet duration limitation, the indication signaling further comprises a longest duration of the packet.

14. The method according to claim 9, further comprising:
    following receiving the indication signaling comprising the transmission opportunity duration limitation, receiving a transmission opportunity duration extension signaling.

15. A non-transitory storage medium having computer instructions stored therein, wherein when the computer instructions are executed, the method according to claim 9 is performed.

16. A terminal comprising a memory and a processor, wherein the memory has computer instructions stored therein, and when the processor executes the computer instructions, the method according to claim 9 is performed.

17. A signaling transmission device, comprising:
    a configuring circuitry configured to: if an advanced setting for transmitting Real Time Application (RTA) packets is supported, configure an indication signaling, wherein the indication signaling is used to instruct a Wireless Local Area Network (WLAN) station to transmit a packet based on packet duration limitation, transmission opportunity duration limitation, or packet duration limitation and transmission opportunity duration limitation, wherein a longest transmission duration of a packet that meets the packet duration limitation is shorter than a longest allowable transmission duration of a packet generated by a WLAN Station (STA), and a longest transmission duration of a packet that meets the transmission opportunity duration limitation is shorter than the longest allowable transmission duration of the packet generated by the WLAN STA; and
    a transmitting circuitry configured to transmit the indication signaling.

* * * * *